US006345439B2

(12) United States Patent
Matuura et al.

(10) Patent No.: US 6,345,439 B2
(45) Date of Patent: *Feb. 12, 2002

(54) METHOD FOR MANUFACTURING A CYLINDER FOR INTERNAL COMBUSTION ENGINE

(75) Inventors: Fujihiro Matuura, Kanagawa; Motoshige Kitazawa, Tokyo, both of (JP)

(73) Assignee: Kioritz Corp. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/437,874

(22) Filed: Nov. 10, 1999

(30) Foreign Application Priority Data

Nov. 10, 1998 (JP) .......................................... 8-318973

(51) Int. Cl.[7] .......................................... B23P 11/00

(52) U.S. Cl. .............................. 29/888.06; 29/888.01; 29/423; 29/527.3; 29/527.6; 164/98

(58) Field of Search ...................... 29/888.06, 888.061, 29/888.01, 423, 424, 527.3, 527.2, 527.5, 527.6; 164/98, 72, 132; 249/184, 122, 142, 175

(56) References Cited

U.S. PATENT DOCUMENTS 3,797,101 A * 3/1974 Bauer ........................ 29/527.3
3,825,055 A * 7/1974 Mino et al. ................ 164/132
3,844,334 A * 10/1974 Frederickson ............... 164/132
3,878,880 A * 4/1975 Jones ............................ 164/9
4,411,709 A * 10/1983 Nakanishi ................... 148/549
4,700,444 A * 10/1987 Yamagata ............. 29/888.061
4,747,573 A 5/1988 Nagashima
4,969,263 A * 11/1990 Adams ................... 29/888.06
5,285,840 A * 2/1994 Hayashi et al. ............ 164/132
5,462,108 A * 10/1995 Katoh et al. .................. 164/98
5,690,159 A * 11/1997 Mizukusa .................. 164/132
5,800,902 A * 9/1998 Shimmell et al. ........... 428/139

FOREIGN PATENT DOCUMENTS

JP 58155114 9/1983
JP 60148657 8/1985
JP 10203750 8/1998
JP 10203751 8/1998

* cited by examiner

*Primary Examiner*—I Cuda Rosenbaum
*Assistant Examiner*—T. Nguyen
(74) *Attorney, Agent, or Firm*—Baker Botts LLP

(57) ABSTRACT

A method of manufacturing a cylinder for an internal combustion engine, which is manufactured by a process wherein a raw cylinder body having an insert core left remained therein is obtained using an insert core comprising a cylindrical body having almost the same outer diameter as the diameter of bore of the cylinder, and a scavenging port-forming portion projecting radially outward from the cylindrical body and having almost the same cross-sectional configuration as that of the scavenging port, the cylinder bore of the raw cylinder body thus obtained is then subjected to a boring to remove the cylindrical portion of the insert core, and the scavenging port-forming portion of the insert core which is left remained in the raw cylinder body is removed by making use of a press.

3 Claims, 8 Drawing Sheets

METHOD FOR MANUFACTURING A CYLINDER FOR INTERNAL COMBUSTION ENGINE

BACKGROUND OF THE INVENTION

The present invention relates to a method for manufacturing a cylinder for-an internal combustion engine such as a small air-cooled two-stroke gasoline engine which is suited for use in a portable working machine, and in particular to a method which enables an undercut portion of the cylinder such as a scavenging port to be rationally formed at the occasion of manufacturing the cylinder by means of a die casting method such as a high-pressure die casting method.

A small air-cooled two-stroke gasoline engine to be used in a portable power working machine is, as seen for instance from Japanese Patent Unexamined Publication S58-155114, generally formed of an aluminum alloy and constituted by an integral body consisting of a main body having a cylinder bore for allowing a piston to be fitted therein, a head portion provided with a squish dome-shaped combustion chamber which is formed therein, and a plurality of cooling fins which are projectingly formed all over the outer wall of the integral body.

The cylinder bore is provided with an air-fuel mixture inlet port and also with an exhaust port, which are to be closed or opened by the movement of the piston, these air-fuel mixture inlet port and exhaust port being disposed to face to each other and to disagree in level from each other. A plurality of hollow scavenging passages, each being spaced away from these air-fuel mixture inlet port and exhaust port by an angle of 90 degrees and having an inner wall of predetermined thickness, are formed along with the cylinder bore. The downstream end portion (upper end portion) of each hollow scavenging passage is constituted by a scavenging port, thereby providing a pair of scavenging ports disposed opposite to each other, which are designed to be opened or closed by the movement of the piston and are inclined somewhat upward in the direction opposite to the exhaust port of the cylinder bore.

The cylinder disclosed in the aforementioned Japanese Patent Unexamined Publication S58-155114 is a so-called binary fluid scavenging type cylinder where a pair of scavenging ports are symmetrically formed with respect to the longitudinal section taken along the middle of the exhaust port. Additionally, a so-called quaternary fluid scavenging type cylinder where a pair of scavenging ports are additionally provided therewith is also known (see Japanese Patent Application H10-203750 which belongs to the same assignee as that of the present application).

As for the type of the scavenging passage, there are known a hollow scavenging passage provided with an inner wall as shown in Japanese Patent Unexamined Publication S58-155114, a scavenging passage having no inner wall (the side facing the cylinder bore is opened) or a scavenging passage provided with a half-wall having a predetermined thickness as disclosed in Japanese Patent Application H10-203751 which belongs to the same assignee as that of the present application wherein the scavenging passage is provided at a lower portion thereof with an opening extending in the longitudinal direction of the scavenging passage while leaving the half-wall at an upper portion thereof so as to allow an air-fuel mixture being introduced into the scavenging port from the crank chamber via the scavenging passage to be contacted with the skirt portion of the piston.

In the method of manufacturing a cylinder provided with an inner wall-type (or a half-wall-type) hollow scavenging passage in particular among the aforementioned cylinders for a two-stroke internal combustion engine by means, of a die casting method such as a high-pressure die casting method which enables cast moldings of high dimensional precision to be produced at low cost, the scavenging port portion of the scavenging passage which constitutes an undercut portion in the casting of the cylinder is generally formed by a method wherein a raw cylinder body is cast-molded with the scavenging port portion (constituting an undercut portion) thereof being left closed, and thereafter, the closed scavenging port portion is cut out by mechanical means (see Japanese Patent Unexamined Publication S58-155114), since a collapsible core cannot be employed under a high pressure.

In the case of the aforementioned method to cut out a scavenging port by mechanical means after the casting of raw cylinder body however, since the space allowing a cutting tool to be inserted into a working portion is very narrow, it is very difficult to perform the mechanical working and to enhance the working precision of the scavenging port. Since the performance of an engine, in particular, a two-stroke internal combustion engine is greatly influenced by the size and configuration of the scavenging port as well as by the working precision thereof, the aforementioned problem is very important.

It may be conceivable to manufacture a cylinder provided with an inner wall-type hollow scavenging passage by means of a die casting method employing an insert core to be inserted into the scavenging port portion. In this case however, since the inserted part is left in the cast product, the heat conductivity of the product is deteriorated and at the same time, various problems such as the deformation or peeling of the inserted part may be caused to occur.

BRIEF SUMMARY OF THE INVENTION

The present invention has been made to overcome the aforementioned problems, and therefore an object of the present invention is to provide a method for manufacturing a cylinder for an internal combustion engine, which makes it possible to manufacture the cylinder by means of a die casting method such as a high-pressure die casting method at low cost and in high precision without raising problems such as the deterioration of heat conductivity or the deformation or peeling of the inserted part.

With a view to realize the aforementioned object, the present invention provides a method of manufacturing a cylinder for an internal combustion engine, which is directed to the manufacture of a cylinder provided with an inner wall-type hollow scavenging passage having a scavenging port to be opened or closed by the movement of piston, the method being featured essentially in that the cylinder is manufactured by means of a die casting method using an insert core comprising a cylindrical body having substantially the same outer diameter as the diameter of bore of the cylinder desired to obtain, and a scavenging port-forming portion projecting radially outward from the cylindrical body and having substantially the same cross-sectional configuration as that of the scavenging port.

According to a preferable embodiment of the method according to the present invention, the cylinder is manufactured by a process wherein the insert core is externally attached to a bore-core die, the resultant casting die is then employed to cast-mold a raw cylinder body with the insert core being left remained therein, the cylinder bore of the resultant raw cylinder body is then bored to remove a cylindrical portion of the insert core, and the scavenging port-forming portion of the insert core which is left remained in the raw cylinder body is removed by making use of a press, etc.

According to a more preferable embodiment of the present invention, a parting agent is coated or plated on the outer surface of at least the scavenging port-forming portion of the insert core, thereby forming a mold-releasing layer prior to the step of die casting.

On the other hand, the insert core according to the present invention that can be employed in the aforementioned manufacturing method is featured in that it comprises not only a cylindrical body having substantially the same outer diameter as the diameter of bore of the cylinder desired to obtain, but also a scavenging port-forming portion projecting radially outward from the cylindrical body and having substantially the same cross-sectional configuration as that of the scavenging port.

According to a preferable embodiment of the present invention, the insert core is formed as an integral body by means of a die casting method using, as a raw material, the same kind of aluminum alloy as that of the cylinder desired to obtain, and a parting agent is coated or plated on the outer surface of the insert core thereby to form the mold-releasing layer.

As for the material for the insert core, it is not limited to the aforementioned aluminum alloy, but any other iron family metals can be employed. If the same kind of aluminum alloy as that of the cylinder is employed as a material for the insert core, the content of an additive such as silicon in the insert core may be increased larger than that of the cylinder, thereby preventing the generation of a fusion bonding between the insert core and the cylinder.

As for the parting agent to be coated or plated on the outer surface of the insert core, chromium, nickel, carbon, etc. can be employed. The coating or plating of these parting agents may be performed using an electrolytic plating or a vapor deposition, thus forming a mold-releasing layer.

According to a preferred embodiment of the method of manufacturing a cylinder for an internal combustion engine by making use of an insert core of the present invention, it is possible, due to the employment of the insert core, to utilize a high-pressure die casting method which enables to obtain a cast product of high dimensional precision. Additionally, since the cylindrical portion of the insert core can be removed by way of a rough boring of the cylinder bore after the die casting, and since the scavenging port-forming portion of the insert core that cannot be removed by the rough boring can be removed by making use of a press after the die casting, it is possible to make the resultant product completely free from any inserted part. As a result, a cylinder can be manufactured in higher precision and at lower cost as compared with the conventional method of cutting out the scavenging port portion by mechanical means after die casting or with the conventional manufacturing method by means of die casting where an insert core to be inserted into the scavenging port portion is employed. At the same time, the aforementioned problems of the deterioration of heat conductivity, and the deformation or peeling of the inserted part due to the remnant of the inserted part in the cast product (cylinder) can be prevented to occur.

DETAILED DESCRIPTION OF THE INVENTION

The present invention will be further explained with reference to one embodiment of the method of manufacturing a cylinder for an internal combustion engine according to the present invention.

Figure 8:
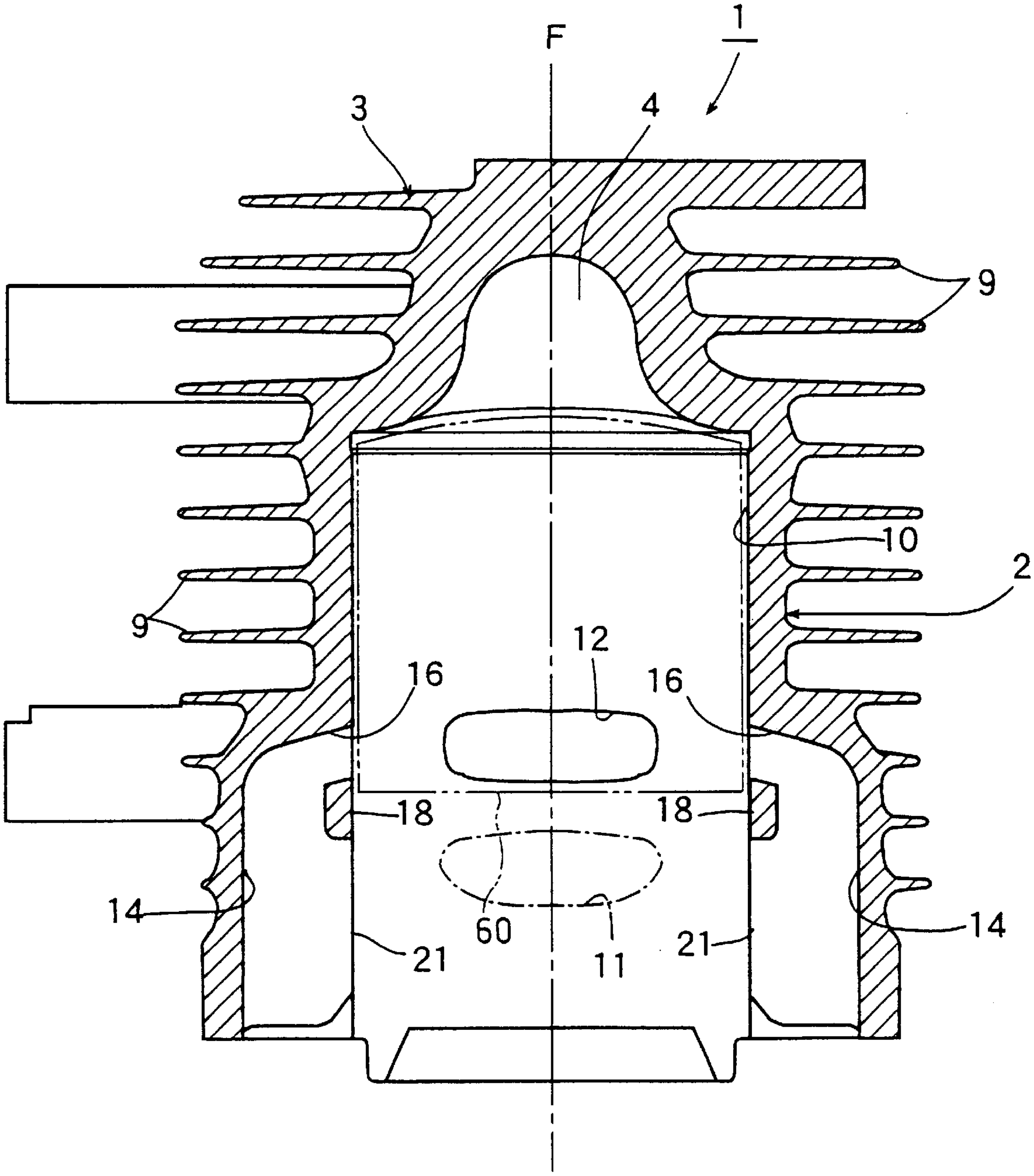
FIG. 8 is a longitudinal sectional view for illustrating a cylinder for a small air-cooled two-stroke gasoline engine, which can be manufactured by the method of manufacturing the cylinder according to the present invention.

The cylinder for an internal combustion engine, which can be manufactured by the method according to this embodiment is a cylinder 1 for a small air-cooled two-stroke gasoline engine as shown in FIG. 8, which can be employed in a portable power working machine.

This cylinder 1 is formed of an aluminum alloy and comprises an integral body consisting of a main body 2 having a cylinder bore 10 for allowing a piston 60 to be fitted therein, a head portion 3 provided with a squish dome-shaped combustion chamber 4 which is formed therein, and a plurality of cooling fins 9 which are formed all over the outer wall of the integral body.

The cylinder bore 10 is provided with an air-fuel mixture inlet port 11 and with an exhaust port 12, which are to be closed or opened by the movement of the piston 60, these inlet port 11 and exhaust port 12 being disposed to face to each other and to disagree in level from each other. Two pairs of hollow scavenging passages 14 and 15 (shown by a phantom line in FIG. 2), each being spaced away from the inlet port 11 and exhaust port 12 by an angle of 90 degrees are formed along with the cylinder bore 10. Namely, the cylinder 1 in this case is a so-called quaternary fluid scavenging type cylinder where two pairs of scavenging ports are symmetrically formed with respect to the longitudinal cross-section F taken along the middle of the exhaust port 12 (see Japanese Patent Application H10-203750 which belongs to the same assignee as that of the present application).

Figure 2:
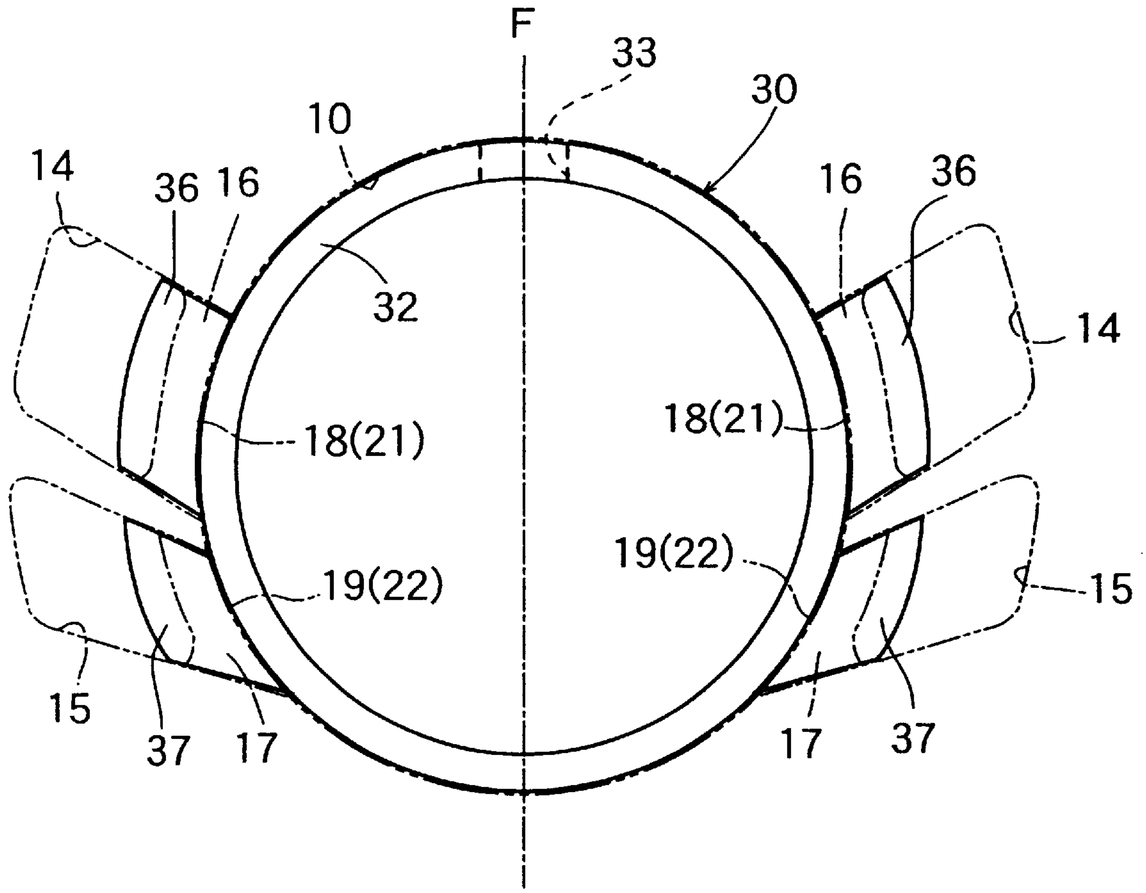
FIG. 2 is a plan view of the insert core shown in FIG. 1.

The downstream end portion (upper end portion) of each hollow scavenging passage 14 or 15 is constituted by a scavenging port 16 or 17, thereby providing two pairs of scavenging ports 16 and 17 disposed opposite to each other (shown by a phantom line in FIG. 2 showing a plan view of the insert core 30 as explained below), which are designed to be opened or closed by the movement of the piston 60 and are inclined somewhat upward in the direction opposite to that of the exhaust port 12 (in the direction of the air-inlet port 11) of the cylinder bore 10.

The scavenging passages 14 are respectively provided with a half wall, so that, as shown in Japanese Patent Application H10-203751, each scavenging passage is provided at a lower portion thereof with an opening 21 extending in the longitudinal direction of the scavenging passage and positioned below a half wall 18 as shown in FIG. 8 or with an opening 22 (FIG. 2) positioned below a half wall 19 (not shown in FIG. 8), while leaving the half-walls 18 and 19 at an upper portion thereof so as to allow an air-fuel mixture being introduced into the scavenging port from the crank chamber via the scavenging passage to be contacted with the skirt portion of the piston. These half-walls 18 and 19 in this case are respectively constructed to have the same inner diameter as that of the cylinder bore 10 and a predetermined thickness.

Figure 1:
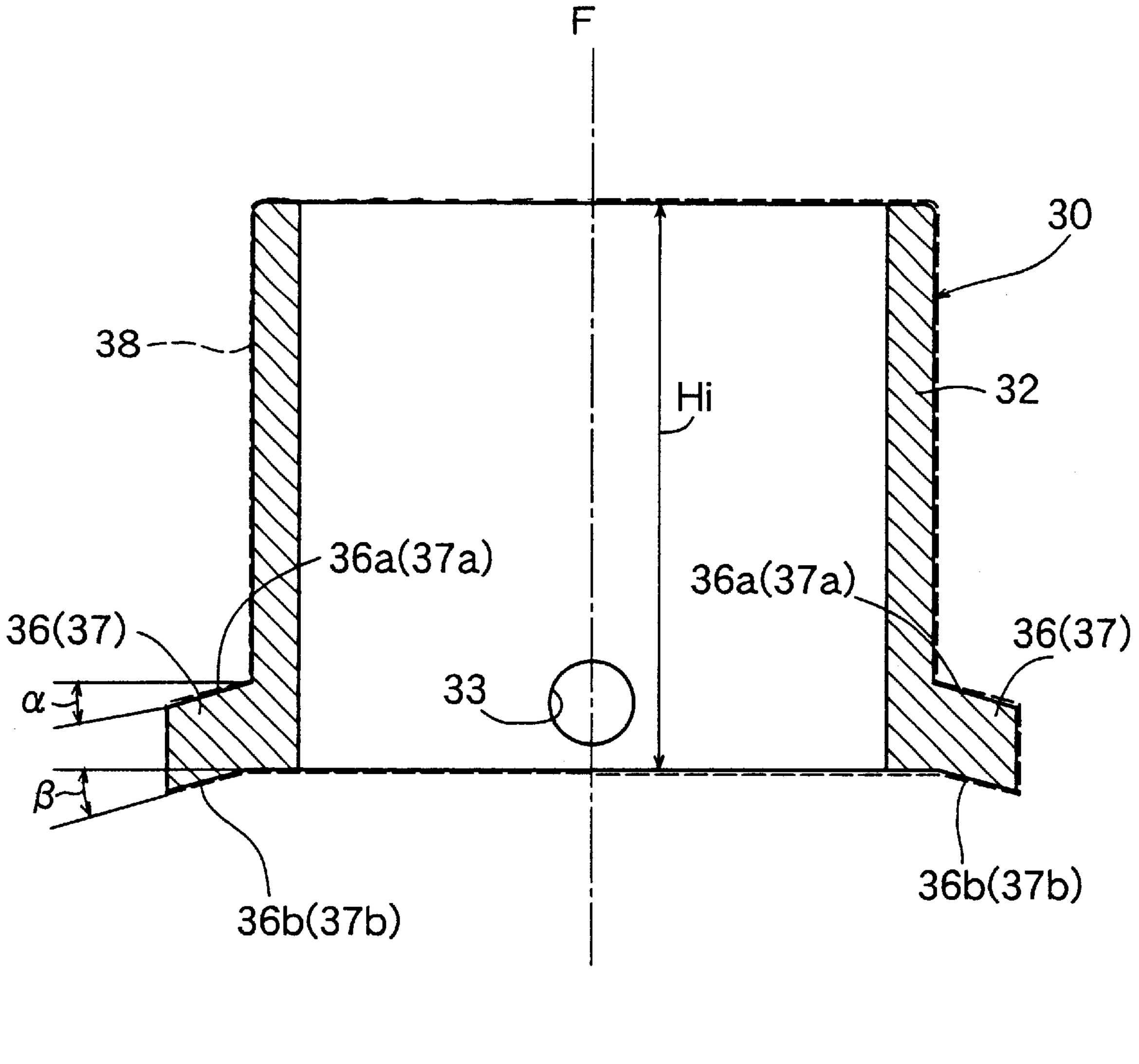
FIG. 1 is a longitudinal sectional view illustrating one embodiment of an insert core to be employed in the manufacturing method according to the present invention.
Figure 3:
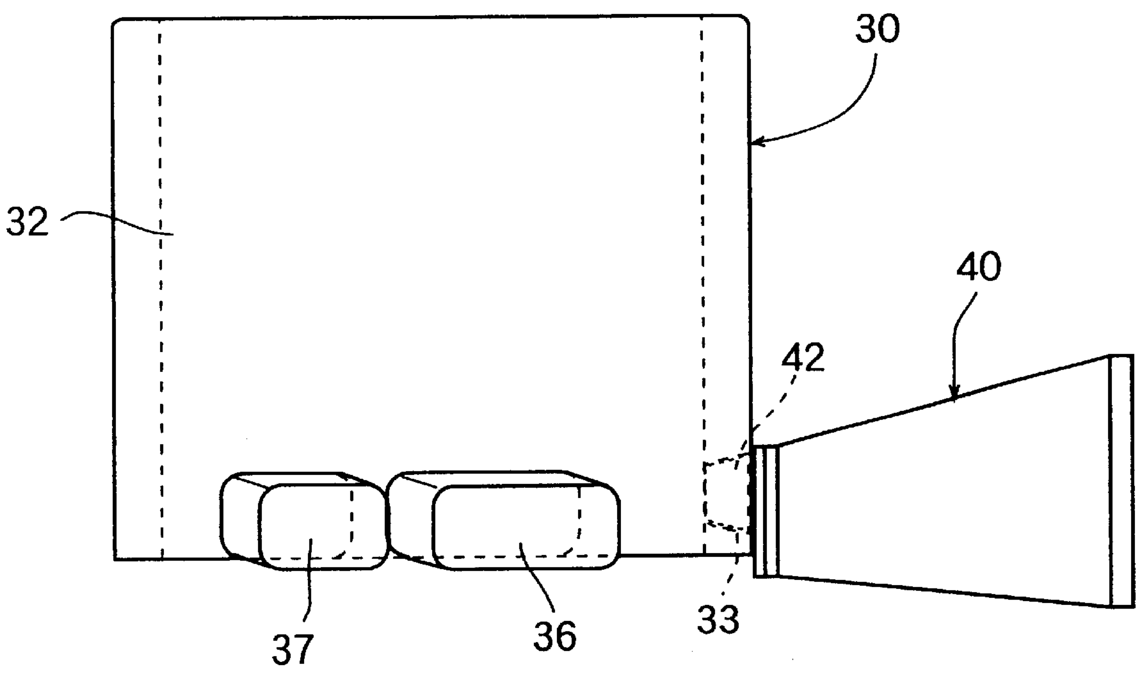
FIG. 3 is a side view of the insert core shown in FIG. 1.

In the manufacturing method according to this embodiment, an insert core 30 as shown in FIGS. 1 to 3 can be employed. Namely, this insert core 30 comprises a cylindrical body 32 having substantially the same outer diameter as the diameter of bore of the cylinder 1 desired to obtain, and two pairs of scavenging port-forming portions 36 and 37, each pair being positioned opposite to each other, projecting radially outward from the cylindrical body 32 and having substantially the same cross-sectional configuration as that of the scavenging ports 16 and 17. This insert core 30 also comprises an insertion hole 33 positioned at lower end portion of the cylindrical body 32 in alignment with the longitudinal section F which is spaced away from the scavenging port-forming portions 36 and 37 by an angle of about 90 degrees, each insertion hole 33 having a diameter which is increasingly enlarged toward the outer wall side of the insert core 30 thereby enabling it to allow a boss 42 of truncated cone shape which is attached to the distal end portion of an exhaust port core 40 to be fitted therein as shown in FIG. 3.

By the way, the height Hi of the cylindrical body 32 (FIG. 1) is made slightly lower than the height Ha from the top of the cylinder bore 10 to the lower end of the scavenging ports 16 (see FIG. 7 to be explained hereinafter).

Further, as shown in FIG. 1, the upper surfaces 36*a* and 37*a* and lower surfaces 36*b* and 37*b* of these two pairs of scavenging port-forming portions 36 and 37 are inclined upward, as viewed from the distal end portion to the proximal end portion thereof (the cylindrical body 32 side), by an angle of a (for example, 13°) and an angle of β (for example, 15°) respectively with respect to the horizontal plane, the distal end portions of these scavenging port-forming portions 36 and 37 being slightly fanned out.

Additionally, the outer surface of the insert core 30 is entirely covered with a mold-releasing layer 38 which is formed by coating or plating a parting agent such as chromium or nickel (see FIG. 1).

The application of this mold-releasing layer 38 may be generally limited to the outer surface of the scavenging port-forming portions 36 and 37. However, in view of preventing the surface portion of the cylinder bore 10 from being torn off at the occasion of cutting off the cylindrical portion 32 of the insert core 30 as discussed below, it is more advisable to form the mold-releasing layer 38 all over the entire outer surface of the insert core 30 as mentioned above.

Figure 4:
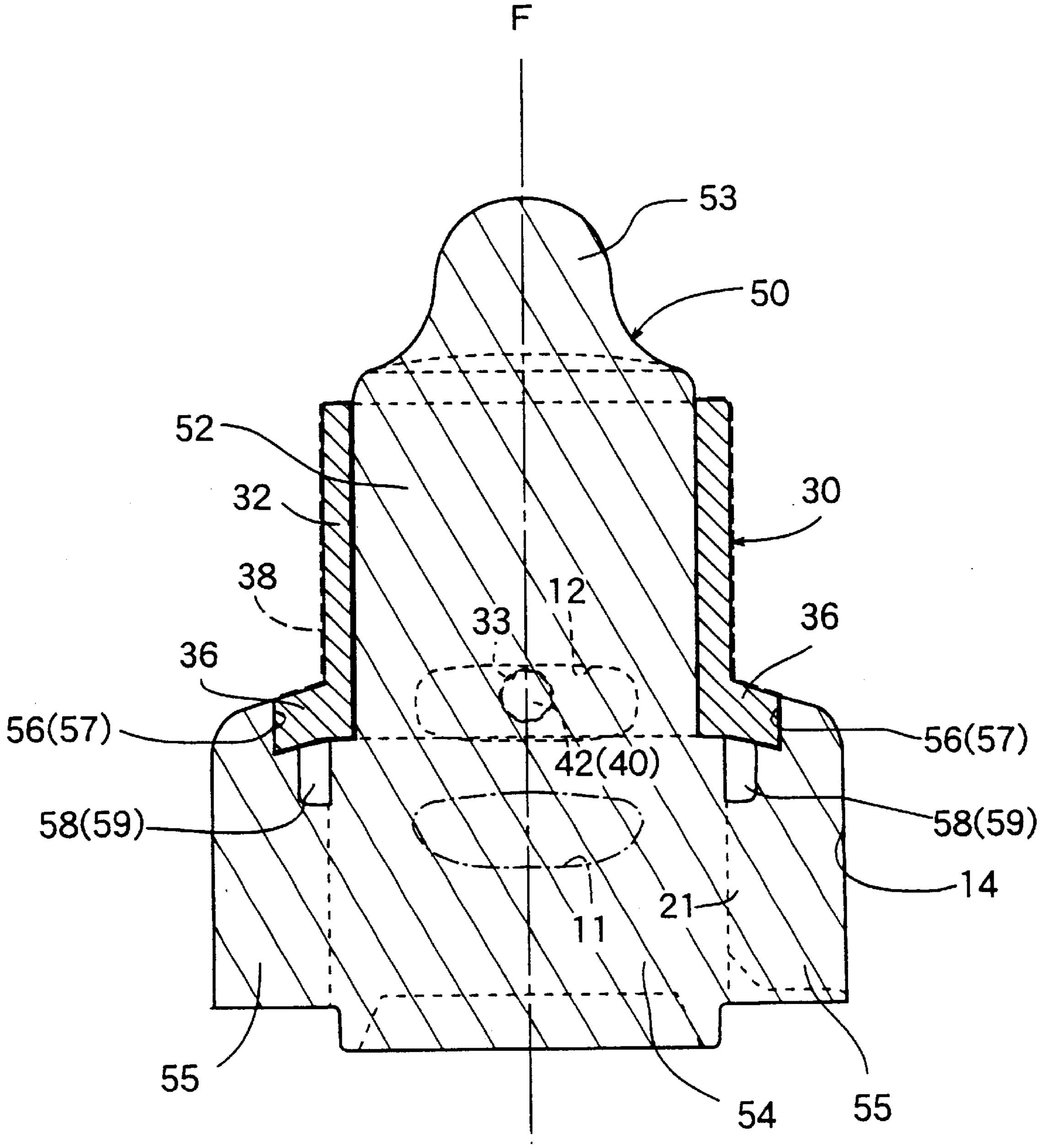
FIG. 4 is a longitudinal sectional view illustrating a state where the insert core shown in FIG. 1 is set in position in the bore-core die.

In the manufacture of the cylinder 1 by making use of the aforementioned insert core 30, the insert core 30 is at first set in position over a bore-core die 50 as shown in FIG. 4, and the truncated cone shaped boss 42 which is attached to the distal end portion of the exhaust port core 40 is inserted into the insertion hole 33 as shown in FIG. 3, thereby positioning the insert core 30 and preventing the insert core 30 from coming out of the bore-core die 50.

The bore-core die 50 is an ordinary core die to be employed in a high pressure die casting method, and comprises a columnar bore insertion portion 52 on which the cylindrical portion 32 of the insert core 30 is fitted, a combustion chamber-forming portion 53 which is formed contiguous with the upper portion of the bore insertion portion 52 and configured to correspond with the combustion chamber 4 of the cylinder 1, a columnar lower bore portion-forming portion 54 which is formed contiguous with the lower end of the bore insertion portion 52, a pair of scavenging passage-forming portions 55 (corresponding with the scavenging passages 14 shown in FIG. 8) which are formed contiguous with the right and left sides of the lower bore portion-forming portion 54, and another pair of scavenging passage-forming portions (not shown) which corresponds with the scavenging passages 15 not shown in FIG. 8.

Figure 7:
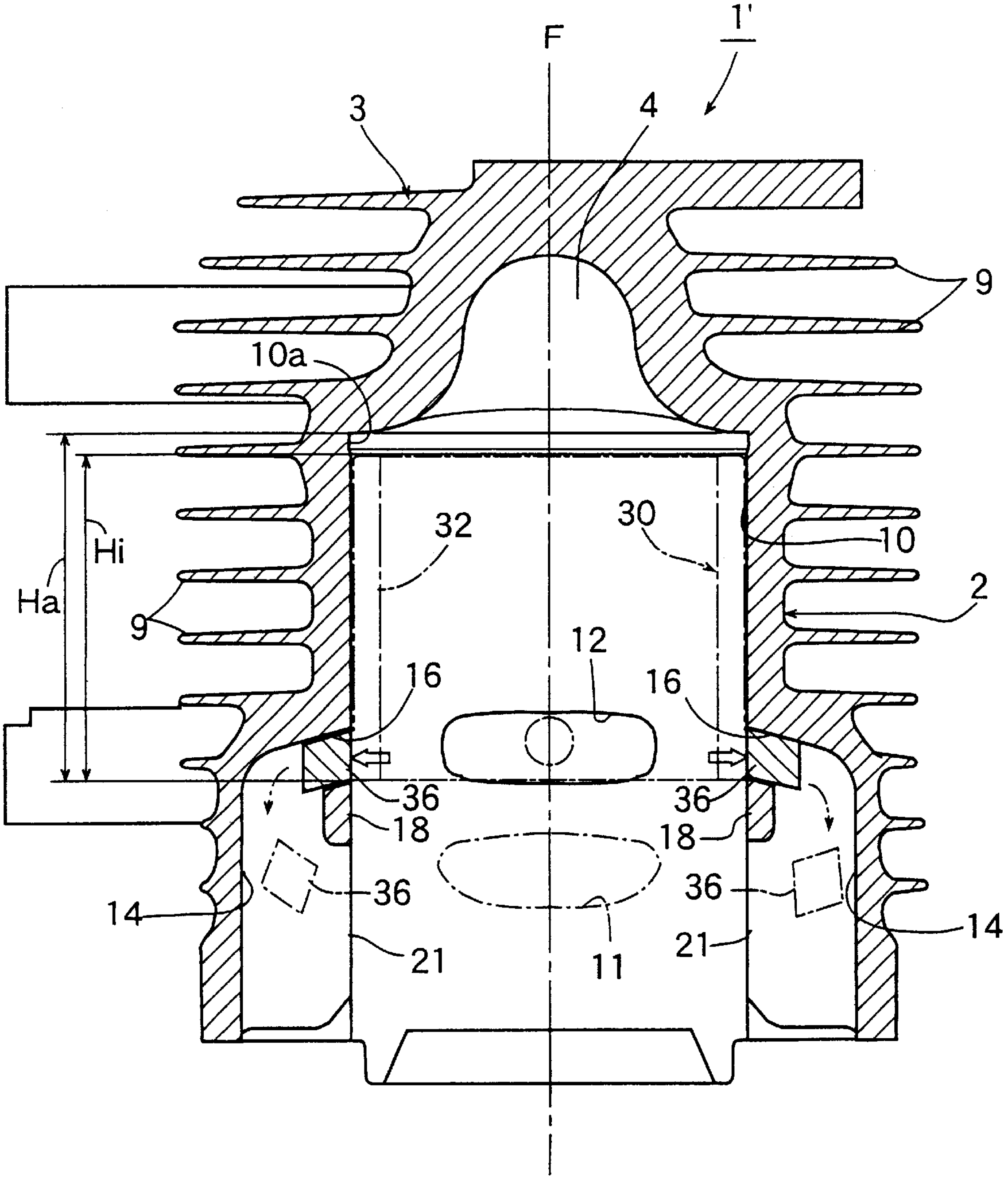
FIG. 7 is a longitudinal sectional view for illustrating a step of removing the scavenging port portion of the insert core by making use of a press, the scavenging port portion being left remained in the cylinder after the rough boring shown in FIG. 6.

The bore insertion portion 52 has an outer diameter which is almost the same size as the inner diameter of the insert core 30 and a height which is slightly higher than the height Hi of the insert core 30 but is almost the same as the height Ha from the top of the cylinder bore 10 to the lower end of the scavenging ports 16 in the cylinder 1 (see FIG. 7).

On the other hand, the lower bore portion-forming portion 54 has an outer diameter which is larger than the outer diameter of the bore insertion portion 52 but is almost the same as the outer diameter of the insert core 30, thereby enabling it to receive and engage with the cylindrical portion 32 of the insert core 30. Further, a pair of scavenging passage-forming portions 55 (shown in FIG. 4) and another pair of scavenging passage-forming portions (not shown in FIG. 4) are respectively provided with cut-out portions 56 (57) into which the scavenging port-forming portions 36 and 37 of the insert core 30 can be inserted and with cut-out portions 58 (59) which correspond with the configuration of the half walls 18 and 19. The lower bore portion-forming portion 54 is designed such that an air-fuel mixture inlet port core (not shown) having a configuration corresponding with the inlet port 11 is to be set therein.

Figure 5:
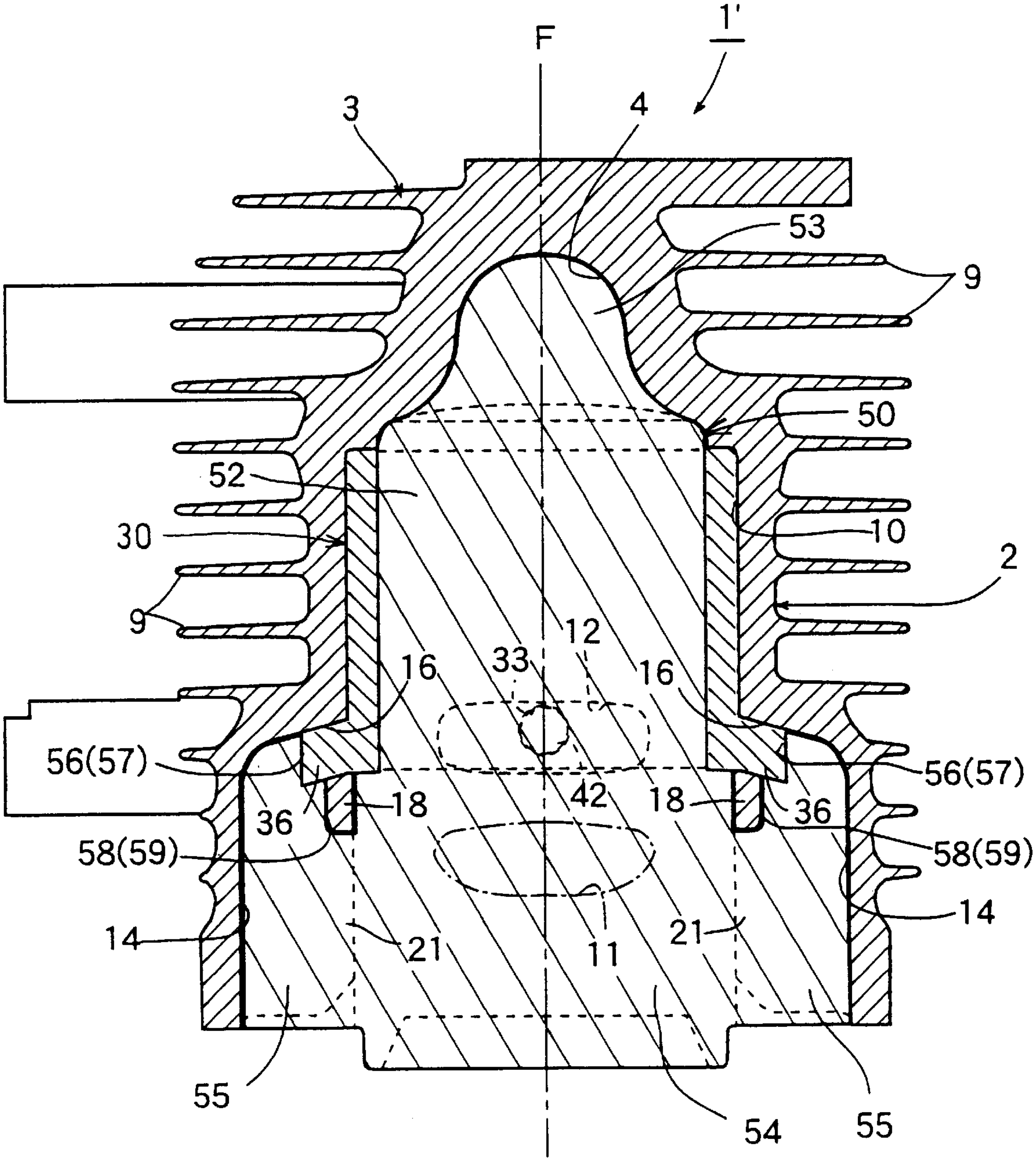
FIG. 5 is a longitudinal sectional view for illustrating the die casting process where the insert core shown in FIG. 1 and the bore-core die are employed.
Figure 6:
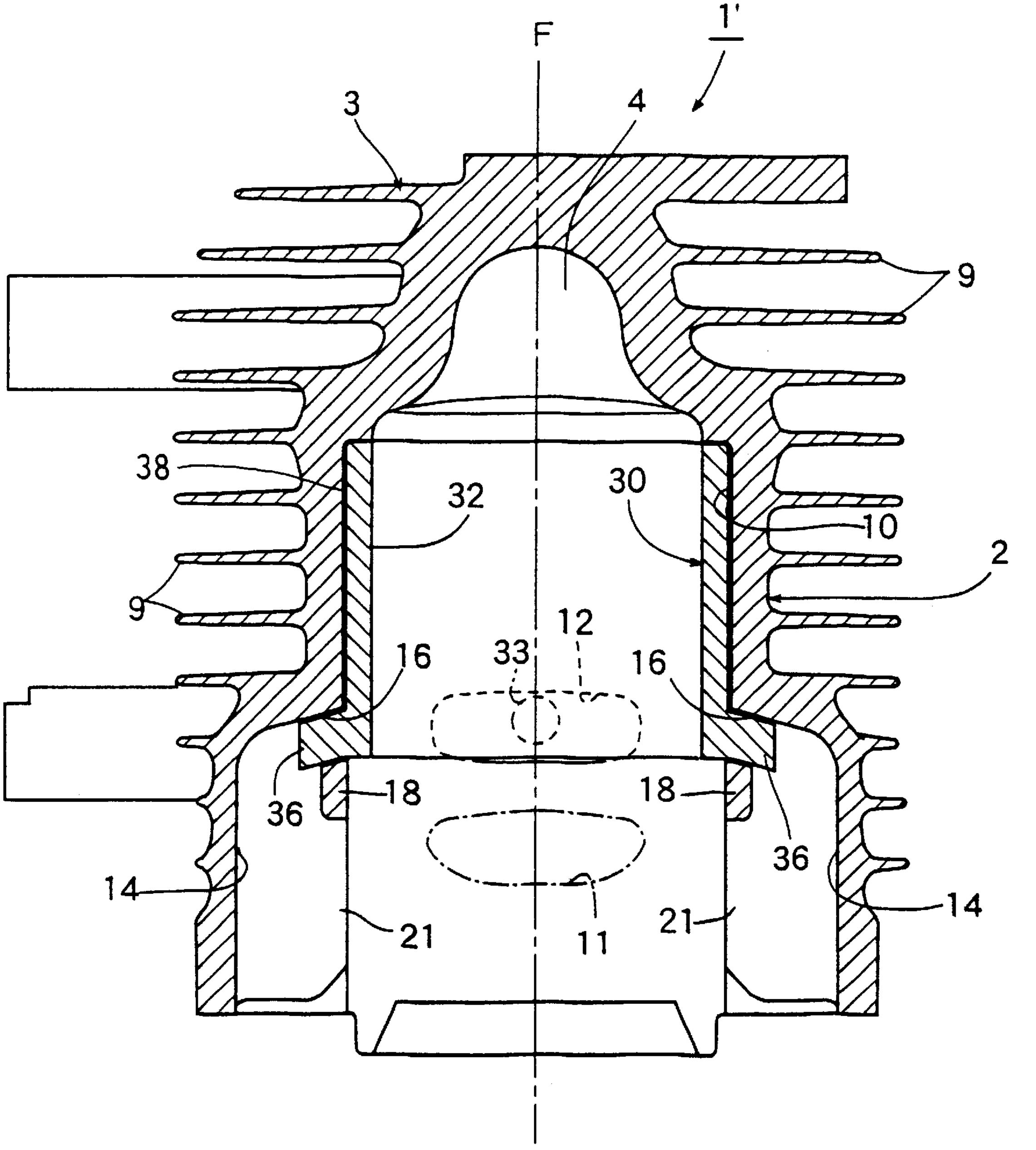
FIG. 6 is a longitudinal sectional view for illustrating a rough boring process for removing the cylindrical portion of the insert core, which can be effected by the rough boring of the cylinder bore of a raw cylinder body produced by a die casting process shown in FIG. 5.

After the insert core 30 is attached to the bore-core die 50, and the exhaust port core 40 and the inlet port core are positioned as mentioned above, a die casting by means of a high pressure die casting is performed as shown in FIG. 5. Subsequently, the bore-core die 50 is withdrawn to obtain a raw cylinder body 1' having the insert core 30 left therein as shown in FIG. 6.

In this state, although the insert core 30 is closely adhered to the bore 10 of the raw cylinder body 1' thus obtained, there is no possibility of generating a fusion-bonding between these members due to the presence of the mold-releasing layer 38 which has been formed in advance on the outer surface of the insert core 30.

Thereafter, as shown in FIG. 7, the rough boring of the cylinder bore 10 of the raw cylinder body 1' is performed thereby to cut off and remove the cylindrical portion 32 of the insert core 30. In this occasion, an upper portion 10a of the cylinder bore 10 (an upper portion of the insert core 30) which is slightly larger in diameter is also formed simultaneous with the removal of the insert core 30.

Then, the scavenging port-forming portions 36 and 37 of the insert core 30, which are left remained in the raw cylinder body 1' are pushed out toward the scavenging passageways 14 and 15 by making use of press, etc. In this case, since the mold-releasing layer 38 is also formed in advance on the outer surfaces of the scavenging port-forming portions 36 and 37 as mentioned above, and also since the scavenging port-forming portions 36 and 37 are formed in a slightly downwardly inclined manner and directed toward the scavenging passages 14 and 15 while extending along the scavenging ports 16 and 17 which are slightly fanned out, the scavenging port-forming portions 36 and 37 can be relatively easily removed by applying a pushing force thereto from the cylinder bore 10 side by making use of the press, etc.

Thereafter, the raw cylinder body 1' is subjected to a predetermined finishing treatment to obtain the cylinder 1 as a product as shown in FIG. 8.

According to the method of manufacturing a cylinder 1 for a two-stroke internal combustion engine by making use of the insert core 30 of this embodiment, it is possible, due to the employment of this insert core 30, to utilize a high-pressure die casting method which enables to obtain a cast product of high dimensional precision at low cost. Additionally, since the cylindrical portion 32 of the insert core 30 can be removed by way of a rough boring of the cylinder bore 10 after the die casting, and since the scavenging port-forming portions 36 and 37 of the insert core 30 that cannot be removed by the rough boring can be removed by making use of a press after the die casting, it is possible to make the resultant product (cylinder) completely free from any inserted part. As a result, the cylinder can be manufactured in higher precision and at lower cost as compared with the conventional method of cutting out the scavenging port portion by mechanical means after die casting or with the conventional manufacturing method by means of die casting where an insert core to be inserted into the scavenging port portion is employed. At the same time, the problems of the deterioration of heat conductivity, and the deformation or peeling of the inserted part due to the remnant of the inserted part in the cast product (cylinder) can be prevented to occur.

While in the foregoing one embodiment of the present invention has been explained in details for the purpose of illustration, it will be understood that the construction of the device can be varied without departing from the spirit and scope of the invention as claimed in the following claims.

It will be clear from the foregoing description that since an insert core comprising a cylindrical body having substantially the same outer diameter as the diameter of bore of the cylinder desired to obtain, and a scavenging port-forming portion having substantially the same cross-sectional configuration as that of the scavenging port is employed in the method of manufacturing a cylinder for a two-stroke internal combustion engine, it is possible to utilize a high-pressure die casting method which enables to obtain a cast product of high dimensional precision at low cost. Additionally, since the cylindrical portion of the insert core can be removed by way of a boring of the cylinder bore after the die casting, and since the scavenging port-forming portions of the insert core that cannot be removed by the boring can be removed by making use of a press after the die casting, it is possible to make the resultant product (cylinder) completely free from any inserted part.

As a result, the cylinder can be manufactured in high precision and at low cost, and at the same time, the problems of the deterioration of heat conductivity, and the deformation or peeling of the inserted part due to the remnant of the inserted part in the cast product (cylinder) can be prevented to occur.

What is claimed is:

1. A method of manufacturing a cylinder for an internal combustion engine, the cylinder having a cylinder bore and a scavenging passage in a portion of a wall of the cylinder with a scavenging port that is opened or closed by the movement of a piston along the cylinder bore, comprising the steps of:

providing an insert core with a cylindrical body portion having an upper end portion and a lower end portion, said cylindrical body portion being of substantially the same outer diameter as the diameter of the bore of the cylinder, and a scavenging port-forming portion located at said lower end portion of said cylindrical body portion and projecting radially outwardly from said cylindrical body portion beyond the outer diameter of said cylindrical body portion and having substantially the same cross-sectional configuration as that of said scavenging port, said scavenging port-forming portion being inclined away from said upper end portion of said cylindrical body portion;

die-casting a raw cylinder body over the outer surfaces of said insert core;

boring said raw cylinder body so as to completely remove said cylindrical body portion of said insert core from said raw cylinder body and separate said scavenging port-forming portion of said insert core from said cylindrical body portion; and removing from said raw cylinder body said scavenging port-forming portion of said insert core by applying a pushing force thereto from inside said raw cylinder body.

2. The method according to claim 1, wherein the step of removing said scavenging port-forming portion of said insert core from said raw cylinder body is performed with a press.

3. The method according to claim 1 or claim 2, and further comprising the step of applying a parting agent on the outer surface of at least the scavenging port-forming portion of said insert core before die-casting the raw cylinder body, thereby to form a mold-releasing layer.

* * * * *